(12) United States Patent
Cochran

(10) Patent No.: US 8,517,698 B2
(45) Date of Patent: Aug. 27, 2013

(54) AIR CONDITIONING COMPRESSOR OVER-TORQUE PROTECTOR

(75) Inventor: Theodore R. Cochran, Amherst, NY (US)

(73) Assignee: Delphi Technologies, Inc., Troy, MI (US)

(*) Notice: Subject to any disclaimer, the term of this patent is extended or adjusted under 35 U.S.C. 154(b) by 118 days.

(21) Appl. No.: 13/050,159

(22) Filed: Mar. 17, 2011

(65) Prior Publication Data

US 2012/0237361 A1  Sep. 20, 2012

(51) Int. Cl.
*F04B 9/00* (2006.01)

(52) U.S. Cl.
USPC ...... 417/319; 417/223; 192/55.1; 192/84.961

(58) Field of Classification Search
USPC .............. 192/55.1, 56.51, 84.961; 464/32; 403/2, 16, 348, 349; 417/223, 319, 374
See application file for complete search history.

(56) References Cited

U.S. PATENT DOCUMENTS

| 4,977,927 | A | * | 12/1990 | Hill ............................. 137/539 |
|---|---|---|---|---|
| 5,443,372 | A | | 8/1995 | Kanoll |
| 5,800,137 | A | * | 9/1998 | Eitai et al. .................... 417/319 |
| 6,056,517 | A | | 5/2000 | Obrist et al. |
| 6,874,328 | B2 | * | 4/2005 | Suzuki et al. .................. 62/193 |
| 7,303,477 | B2 | | 12/2007 | Son |
| 7,314,415 | B2 | | 1/2008 | Umemura |
| 2003/0211893 | A1 | | 11/2003 | Ueda et al. |
| 2005/0239555 | A1 | * | 10/2005 | Ueda et al. ..................... 464/32 |
| 2007/0078011 | A1 | * | 4/2007 | Nosaka et al. ................. 464/32 |

* cited by examiner

*Primary Examiner* — Peter J Bertheaud
*Assistant Examiner* — Dnyanesh Kasture
(74) *Attorney, Agent, or Firm* — Robert J. Myers

(57) ABSTRACT

An automotive air conditioning compressor assembly that includes a compressor capable of exhibiting an over-torque condition, an electromagnetic clutch, and an over-torque protection device located between the compressor and the accessory drive. The over-torque protection device is configured to decouple the compressor and the accessory drive when the over-torque condition occurs. The over-torque protection device uses a frangible part that breaks when an over-torque condition occurs and parts equipped with helical ramps to force the rotor and stator of the clutch apart to disengage the compressor from the vehicle accessory drive.

12 Claims, 6 Drawing Sheets

AIR CONDITIONING COMPRESSOR OVER-TORQUE PROTECTOR

TECHNICAL FIELD OF INVENTION

The invention generally relates to an automotive air conditioner equipped with a clutch, and more particularly relates to an automotive air conditioner compressor with an over-torque protection device for protecting an accessory drive.

BACKGROUND OF INVENTION

In general, an automotive air-conditioning system serves to maintain the interior temperature of an automobile below an outside temperature through a cyclic operation of compression, condensation, expansion and evaporation of refrigerant. The above cyclic operation generally requires a compressor, a condenser, an expansion valve and an evaporator. The compressor is typically powered by an accessory drive. The compressor may be a fixed displacement or a variable displacement type compressor. The compressor operation may be controlled by an engagement or disengagement of a clutch, depending on the conditions of the system.

The clutch is typically located between the accessory drive and the compressor. The clutch typically incorporates a pulley that engages an accessory drive belt. The type of clutch most often used in automotive air conditioner compressor applications is an electromagnetic clutch, although mechanical, hydraulic or other clutch types could also be used. An electromagnetic clutch is usually preferred due to ease of packaging and control. An electromagnetic clutch typically operates by using an electromagnet to hold an armature to a rotor. In many automotive air conditioners, the armature is attached to the compressor and the rotor is attached to the accessory drive. Some compressors engage and disengage the clutch to cycle the automotive air conditioner compressor on and off as needed.

During the operation of the compressor, an over-torque condition may occur when the normal operating torque of the compressor is exceeded due to a mechanical problem in the compressor, such as a bearing seizing. Some automotive air conditioner compressors that are equipped with clutches are also configured to stop coupling torque between an accessory drive and the compressor if the compressor causes an over torque condition on the accessory drive. This is desirable to avoid damage to the accessory drive that may render other components connected to the accessory drive, such as an alternator or coolant pump, inoperative.

When an over-torque condition occurs, the torque applied to the clutch may exceed the ability of the magnetic field from the rotor to hold the armature in place. The torque from the accessory drive may cause the rotor to slip and rotate relative to the armature. Heat may be generated by the friction between the armature and rotor. If the clutch is not disengaged, heat generated by friction could damage the accessory drive belt or the clutch bearings. There are several ways an electromagnetic clutch can be disengaged to decouple the compressor from the accessory drive when an over-torque condition occurs. Excessive heat generated by friction between the rotor and armature may cause a thermal fuse to open and de-energize the coil 24. Alternately, a thermal sensor may detect excessive heat and trigger an electronic compressor controller to de-energize the coil 24. Optionally, a motion sensor can detect that the compressor has stopped rotating or that a speed differential exists between the compressor and accessory drive and provide an indication for an electronic compressor controller to de-energize the coil 24.

The methods previously used to disengage the clutch under over-torque conditions have potential disadvantages. For example, temperature tolerances in thermal fuses may cause a thermal fuse to open at temperatures within normal operating conditions or the thermal fuse may fail to open during over-torque conditions. A thermal fuse may not quickly disengage the clutch to decouple the compressor from the accessory drive because of the time needed for friction to generate excessive heat. The typical time required for a thermal fuse to open for an over-torque condition event may be 50 to 80 seconds. If the accessory drive pulley 18 has a low engagement percentage, the accessory drive pulley may experience belt slip during an over-torque condition before slip between the armature and rotor occurs. In these cases, the accessory drive belt may be damaged before the thermal fuse opens. Therefore, a thermal fuse is not preferred for these applications.

Likewise, a thermal sensor may not quickly disengage the clutch to decouple the compressor from the accessory drive because of the time needed for friction to generate excessive heat. A motion detector may not quickly disengage the clutch to decouple the compressor from the accessory drive due to the time required to detect that the compressor has stopped rotating or that a speed differential exists between the compressor and accessory drive. Additionally, thermal sensors and motion sensors are more expensive than thermal fuses and additionally require electrical connections to an electronic controller, and so are also not preferred.

SUMMARY OF THE INVENTION

In accordance with one embodiment of this invention, an automotive air conditioning compressor assembly is provided. The automotive air conditioning compressor assembly includes a compressor, a clutch, and an over-torque protection device. The compressor is operable to compress material within the compressor. The compressor is capable of exhibiting an over-torque condition. The clutch is operable to an engaged state wherein an accessory drive is coupled to the compressor for operating the compressor, and operable to a disengaged state. The over-torque protection device is interposed between the compressor and the accessory drive. The over-torque protection device configured to decouple the compressor and the accessory drive when the over-torque condition occurs.

In another embodiment of the present invention, a clutch assembly for use with an automotive air conditioning compressor is provided. The clutch is operable to an engaged state wherein an accessory drive is coupled to the compressor for operating the compressor, and operable to a disengaged state.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
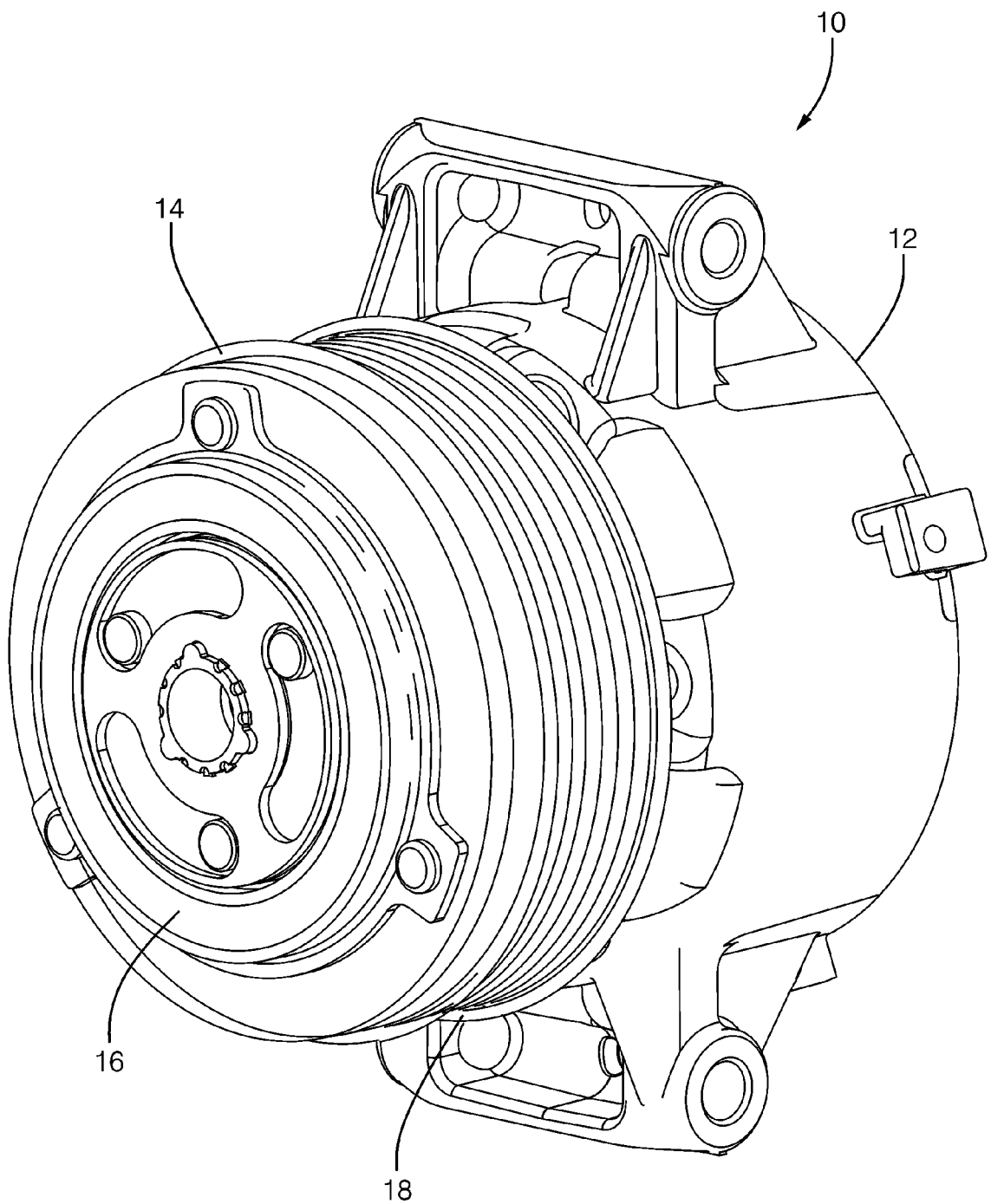
FIG. 1 is an automotive air conditioner assembly including a clutch and an over-torque protection device in accordance with one embodiment.
Figure 6:
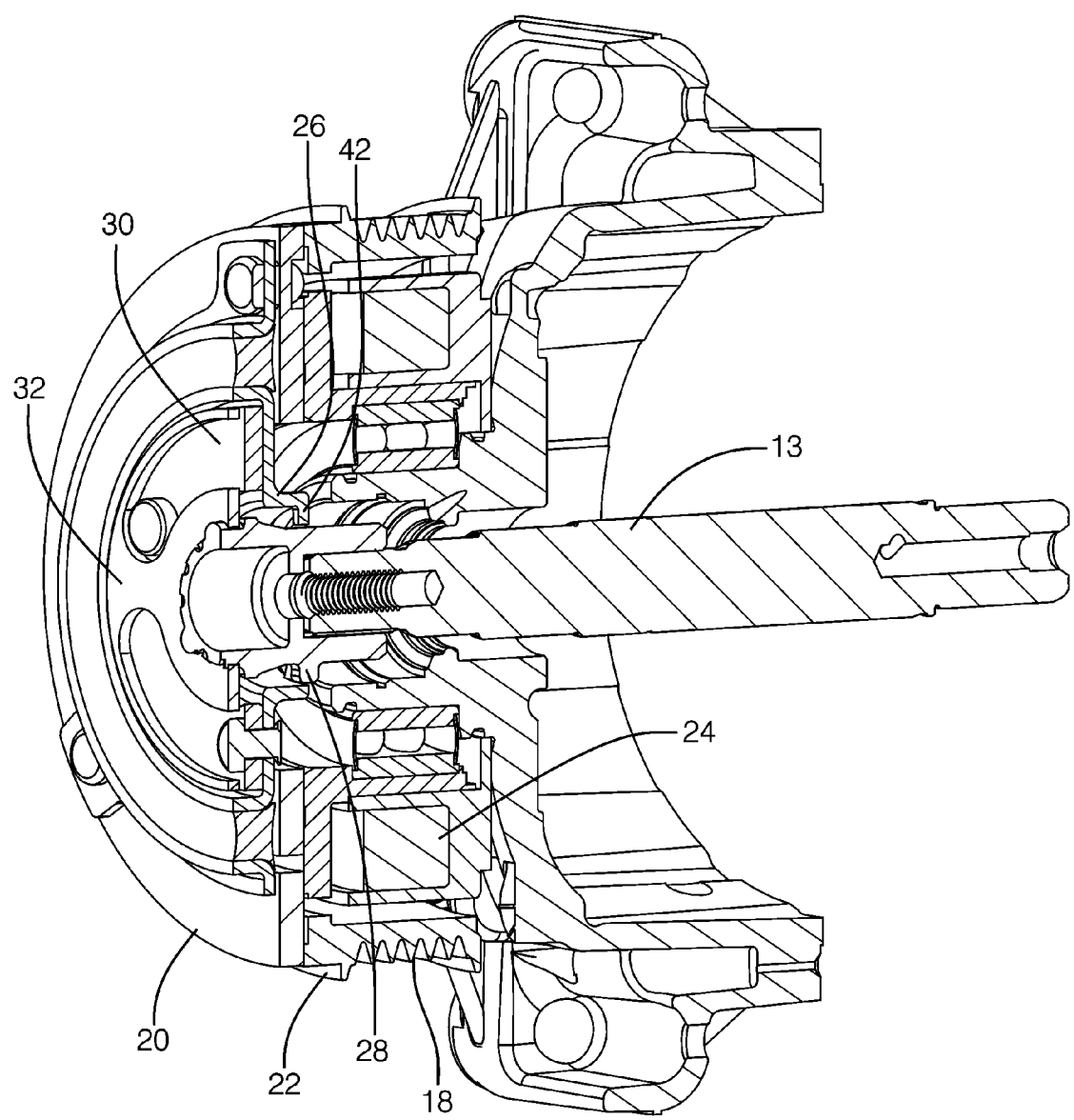
FIG. 6 is cut away view of an automotive air conditioner assembly of FIG. 1 including the over-torque protection device in accordance with one embodiment.

In accordance with an embodiment of an automotive air conditioning compressor assembly 10, FIG. 1 illustrates a compressor 12 that compresses material, in this case refrigerant, within the compressor 12. The compressor 12 includes an input shaft 13 (FIG. 6) to provide mechanical energy to operate the compressor 12. The input shaft 13 is coupled to an accessory drive (not shown) which provides mechanical energy to the compressor. A non-limiting example of an accessory drive is a serpentine belt, sometimes called a fan belt, that transfers mechanical energy from an automobile engine.

The compressor 12 may include a clutch 14 coupled to the input shaft 13 and interposed between the input shaft 13 and the accessory drive. The clutch 14 may include an accessory drive pulley 18 that may be coupled to the accessory drive belt (not shown). The clutch 14 may be operable to an engaged state wherein the accessory drive is coupled to the input shaft 13 for operating the compressor 12. Alternately, the clutch 14 may be operable to a disengaged state wherein the input shaft 13 is decoupled from the accessory drive.

The compressor 12 may be a fixed displacement compressor or a variable displacement compressor. The compressor 12 may be capable of exhibiting an over-torque condition. Conditions that may cause the compressor 12 to exhibit an over-torque condition include, but are not limited to, a bearing failure or a piston seizure within the compressor 12. An over-torque condition may cause the input shaft 13 to transfer an increased mechanical load onto the accessory drive leading to an over-torque condition on the accessory drive coupled to the clutch 14. The over-torque condition may cause the clutch 14 to slip internally or may cause the accessory drive belt to slip on the accessory drive pulley 18. Either of these slip conditions may cause damage to the accessory drive.

When an over-torque condition occurs it may be desirable to quickly decouple the compressor 12 from the accessory drive to avoid damage to the accessory drive that may render other components connected to the accessory drive, such as an alternator or coolant pump, inoperative. By quickly disengaging, that is by disengaging in less than one revolution of the compressor or in less than 100 milliseconds, damage to the accessory drive and related components may be minimized. The assembly 10 may also include an over-torque protection device 16 may be interposed between the compressor and the accessory drive. The over-torque protection device 16 may be configured to decouple the compressor 12 and the accessory drive when the over-torque condition occurs. When the compressor 12 and accessory drive are decoupled, there is no longer a mechanical connection capable of providing torque between the compressor 12 and the accessory drive.

Figure 2:
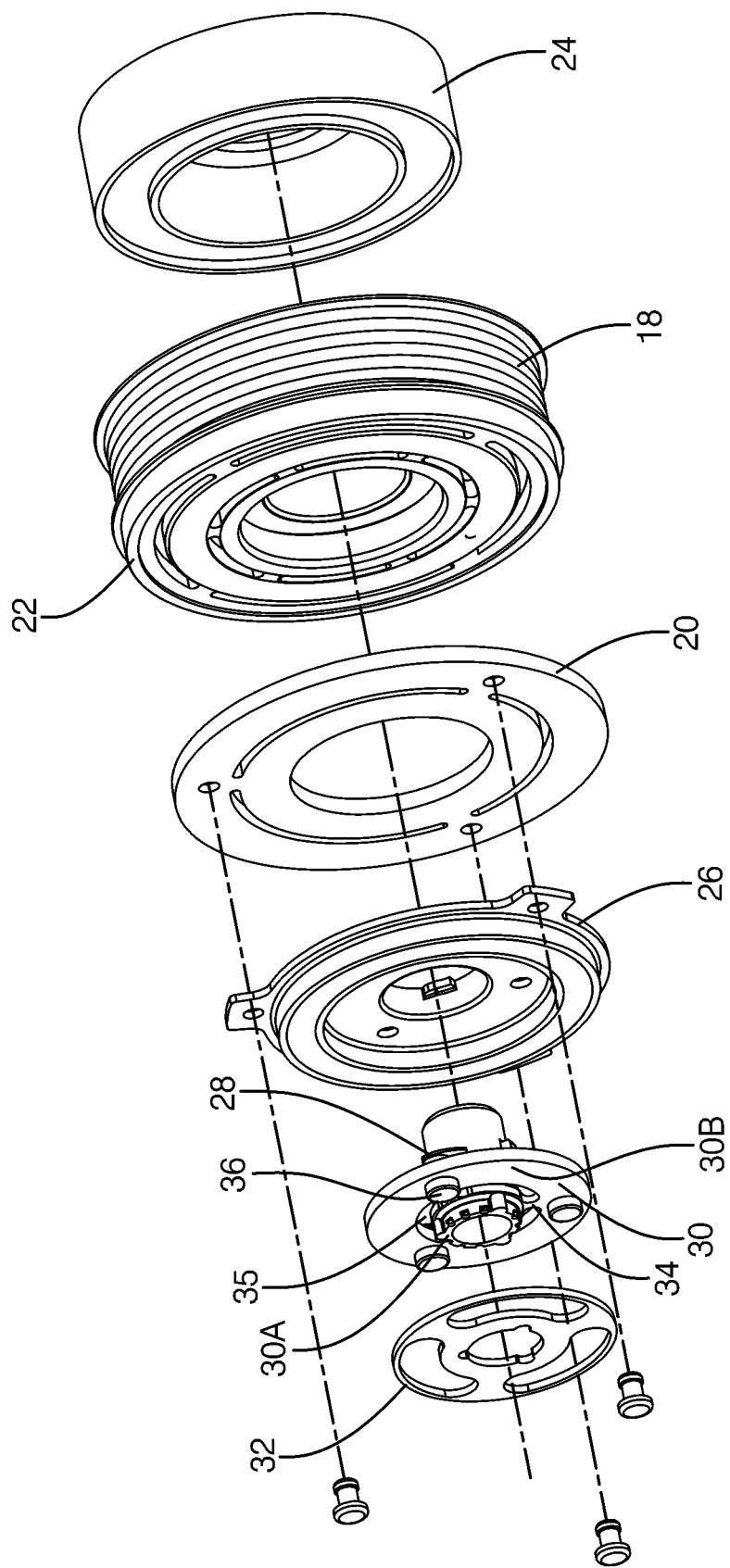
FIG. 2 is an exploded view of the electromagnetic clutch and the over-torque protection device of FIG. 1 in accordance with one embodiment.

FIG. 2 illustrates an embodiment of an over-torque protection device 16 that includes a frangible element 30 that may mechanically fracture during over-torque conditions to quickly decouple the compressor 12 from the accessory drive. In this non-limiting example, the frangible element 30 comprises an annular inner section 30A coupled to the input shaft 13, and an annular outer section 30B, coupled to an armature 20 that is coplanar and concentric with the inner section 30A. The frangible element 30 may include a plurality of spokes 34 formed in the frangible element 30 that define radial slots 33 and couples the inner section 30A to the outer section 30B. When an over-torque condition occurs, the torque applied to frangible element 30 by the clutch 14 from the accessory drive may cause the spokes 34 to fracture and mechanically decouple the inner section 30A from the outer section 30B, thereby quickly decoupling the compressor 12 from the accessory drive. The spokes 34 may be embossed to achieve a controlled thickness, so as to more precisely determine the reaction torque between the accessory drive pulley 18 and the input shaft 13 that will break the frangible element 30 and result in quickly decoupling of the accessory drive pulley 18 from the input shaft 13.

The frangible element 30 may be made from a powdered metal, such as iron, copper, or copper infiltrated steel. For a typical passenger vehicle, the thickness of the frangible element 30 may be 4 to 7 mm and the cross sectional area of the spokes 34 may be 15 to 20 $mm^2$ at a radius 12 to 16 mm from the center of the input shaft 13. It will be appreciated that the spoke thickness and spoke width may depend on the material used to manufacture the frangible element 30, the radial location of the spokes 34 on the frangible element 30, the diameter of the accessory drive pulley 18, and the percentage of the accessory drive pulley 18 contacting the accessory drive belt, as well as other factors.

It has been suggested that the frangible element may be a shear pin (not shown) that couples a hub, affixed to the armature 20, to the input shaft 13. Like the spokes 34, the shear pin is configured to break during over-torque conditions to disconnect the hub from the input shaft 13, thereby disconnecting the compressor 12 from the accessory drive. However, after the shear pin breaks, the hub and input shaft 13 may not be fully decoupled as there may still be residual torque and/or heat generation due to the friction between the hub and input shaft 13 that are still in mechanical contact even though no longer coupled.

It has also been suggested that the frangible element may be a breakaway input shaft (not shown) which has a predetermined break point in the input shaft 13 that is located between a hub that is fixed to the armature 20 and the compressor 12. The input shaft 13 is configured to break at the predetermined break point when an over-torque condition occurs, thereby disconnecting the compressor 12 from the accessory drive. The breakaway shaft suffers from the same disadvantage as the shear pin in that the hub and input shaft 13 may not be fully decoupled and there may still be residual torque and/or heat generation caused by parts rubbing against each other.

It has been suggested that the over-torque protection device could alternately include a mechanical release device. The method of separating the torque from the accessory drive to the compressor is accomplished by the means of a spring, cam, hook, ratchet, or gears to name only a few methods that could be used as a mechanical release. While such devices may provide resettable over-torque protection, the cost and complexity of such a solution is undesirable in view of the general rarity of an over-torque condition.

In accordance with an embodiment wherein the clutch 14 is an electromagnetic clutch, the clutch 14 operates to the engaged state by urging an armature 20 and a rotor 22 together via magnetic force from a magnetic field generated in the rotor by an electric current flowing through coil 24, see FIG. 2. Under normal operating conditions, the clutch 14 is disengaged when electric current stops flowing through the coil 24 and the magnetic field collapses. During an over-torque condition, the over-torque protection device 16 disengages the clutch 14 by exerting an axial mechanical force in opposition to the magnetic force and of sufficient magnitude to overcome the magnetic force and urge the armature 20 and rotor 22 apart.

FIG. 2 illustrates an embodiment of an over-torque protection device 16 that includes a lifting feature 26 configured to urge the armature 20 and rotor 22 apart when an over-torque condition occurs to quickly decouple the compressor 12 from the accessory drive. In this non-limiting example, the lifting feature 26 defines a lifting ridge 42. The lifting feature 26 is coupled to the outer section 30B of the frangible element 30. The lifting ridge 42 may be generally coplanar with the armature 20. A ramp 28 defines a helical ridge 38. The ramp 28 is coupled to the inner section 30A of the frangible element 30. By this arrangement, the lifting ridge 42 is configured to engage the helical ridge 38 when rotated relative to each other and so separate the armature 20 and the rotor 22. The embodiment of the lifting feature 26 illustrated in FIG. 2 incorporates an annular ring torque cushion configured to mitigate shock to the compressor assembly during normal clutch engagement. Alternate embodiments of the lifting feature 26 may be envisioned that would incorporate other shock mitigation devices or incorporate no shock mitigation device whatever.

When an over-torque condition causes the frangible element 30 to break, the inner section 30A of the frangible element 30 and outer section 30B of the frangible element 30 are decoupled. Torque applied to the clutch 14 by the accessory drive may cause relative rotation between the outer section 30B that is coupled to the clutch 14 via the armature 20 and the inner section 30A that is coupled to the input shaft 13. Therefore, the lifting feature 26 coupled to the outer section 30B rotates relative to the ramp 28 coupled to the inner section 30A. It follows that the lifting ridge 42 rotates relative to the helical ridge 38 and moves along the helical ridge 38.

As the lifting ridge 42 moves along the helical ridge 38, it generates an axial mechanical force in opposition to the magnetic force of the rotor 22. The axial mechanical force overcomes the magnetic force and urges the armature 20 and the rotor 22 apart to quickly decouple the compressor 12 from the accessory drive. Additionally, the outer section 30B is axially urged apart from the inner section 30A preventing the broken ends of the spokes 34 from coming into contact during subsequent rotation.

FIG. 2 illustrates an embodiment of a ramp 28. This non-limiting example shows a ramp 28 with a left-handed helical ridge 38 that exerts an axial mechanical force to urge the armature 20 and rotor 22 apart when the lifting feature 26 rotates in a clockwise direction. Alternately, a right hand helical ridge exerts an axial mechanical force to urge the armature 20 and rotor 22 apart when the lifting feature 26 rotates in a counterclockwise direction.

The lifting feature 26 may be incorporated with a mechanical shock dampening device affixed to the armature 20 as shown in a non-limiting example illustrated in FIG. 2. Alternately, the lifting feature 26 may be incorporated with the armature 20. It would be recognized that it is equally effective if the locations of the ramp 28 and lifting feature 26 are switched. There may be other embodiments foreseen that incorporate a helical ridge on the lifting feature 26 that engages the ramp 28.

Figure 4:
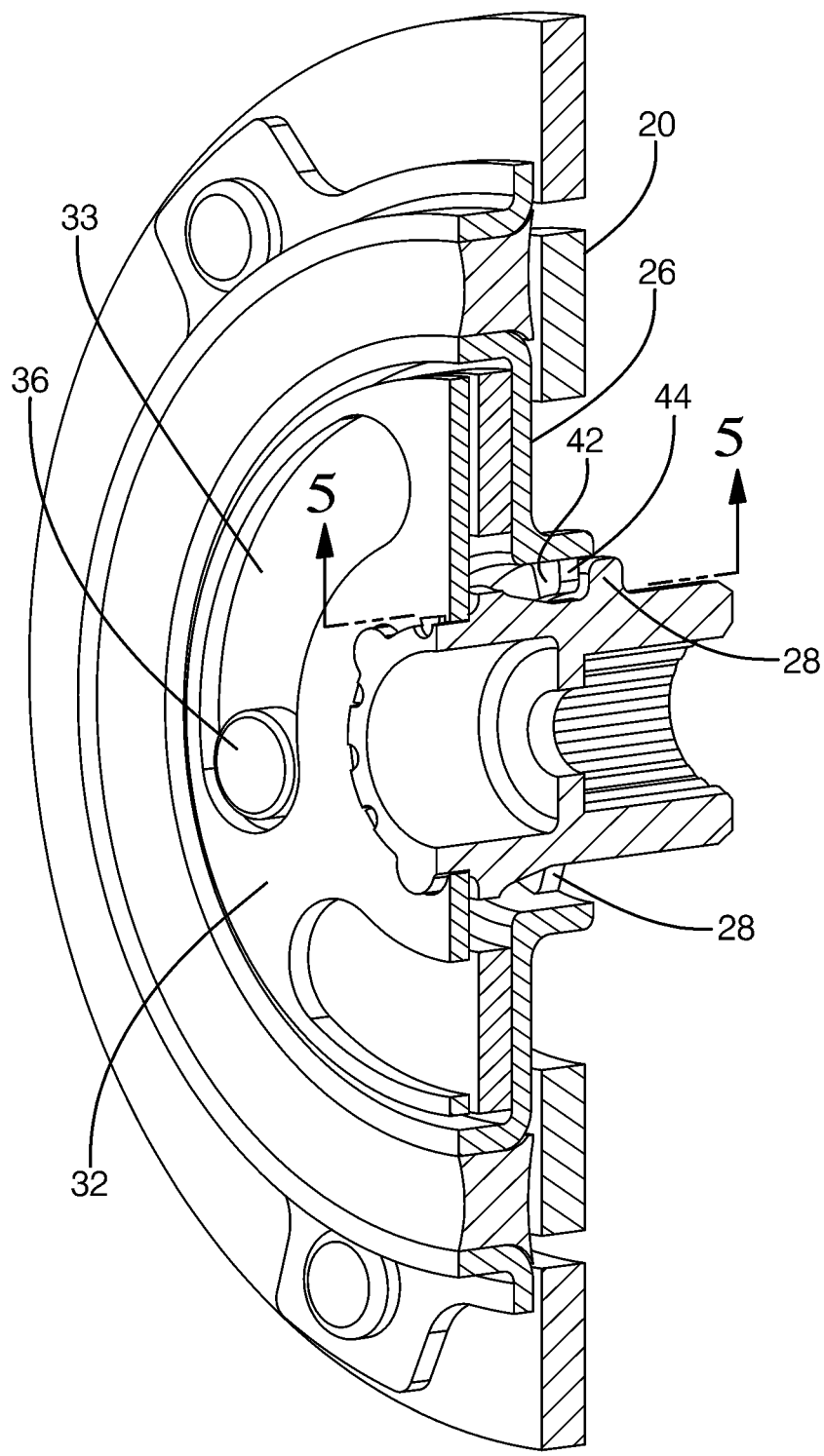
FIG. 4 is a cut-away view of the over-torque protection device of FIG. 1 in accordance with one embodiment.

FIG. 4 illustrates an embodiment of an over-torque protection device 16 that includes an over-rotation feature 32 that limits the rotation of the lifting feature 26 to less than one revolution after the frangible element 30 has broken. In this non-limiting example, the over-rotation feature 32 is coupled to the inner section 30A of the frangible element 30. The over-rotation feature 32 defines radial slots 33 that engage with stops 36 that are affixed to the outer section 30B of the frangible element 30. Prior to an over-torque condition, the stops may be in contact with an end of the radial slots 33.

The radial slots 33 are configured so that after the inner section 30A breaks from the outer section 30B following an over-torque condition, the stops 36 will move through the radial slots 33 until they contact the opposite ends of the radial slots 33. Once the stops 36 contact the opposite end of the radial slots 33, the relative rotation between the inner section 30A and outer section 30B ends. This will also end rotational movement between the ramp 28 and lifting feature 26.

After the armature 20 and the rotor 22 have been urged apart by the lifting feature 26 and ramp 28, the rotational inertia of the armature 20 should be sufficient to cause the armature 20 to rotate until the stops 36 contact the opposite ends of the radial slots 33.

Figure 3:
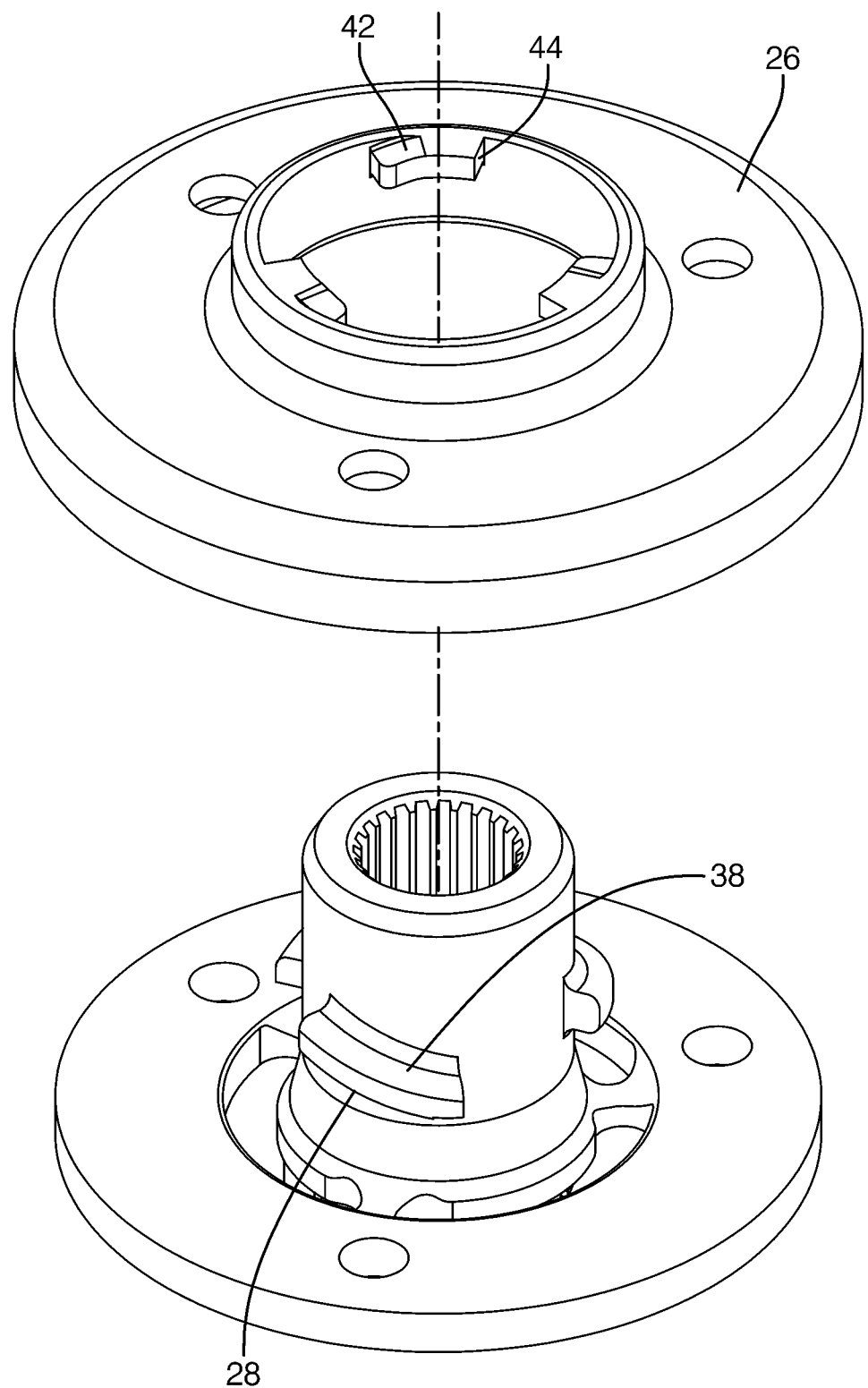
FIG. 3 is a hub in the over-torque protection device of FIG. 1 in accordance with one embodiment.

FIG. 3 illustrates an embodiment of a ramp 28 that includes a locking feature 40 to prevent counter-rotation of the lifting feature 26 after the stops 36 engage the opposite ends of the radial slots 33. In this non-limiting example, the locking feature 40 comprises a notch on the upper end of the ramp 28 that engages a trailing edge 44 of the lifting ridge 42. The locking feature 40 is configured to allow the trailing edge 44 of the lifting ridge 42 to engage the locking feature 40 prior to the engagement of the stops 36 with the opposite ends of the radial slots 33.

Figure 5A:
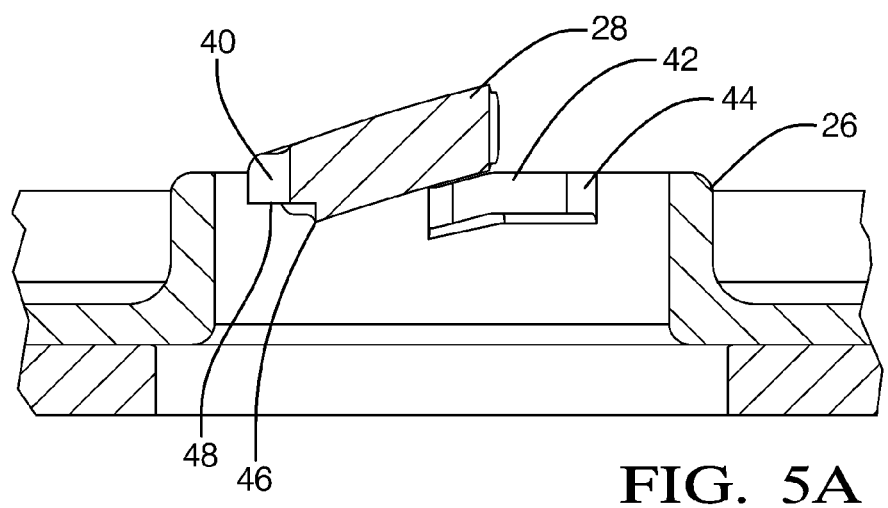
FIG. 5 shows a progression of motion of the over-torque protection device of FIG. 1 in accordance with one embodiment.
Figure 5B:
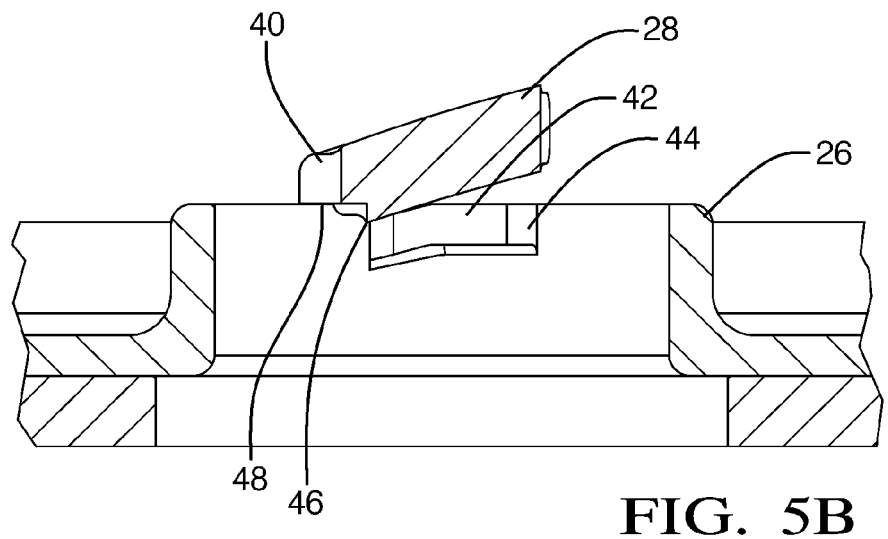
Figure 5C:
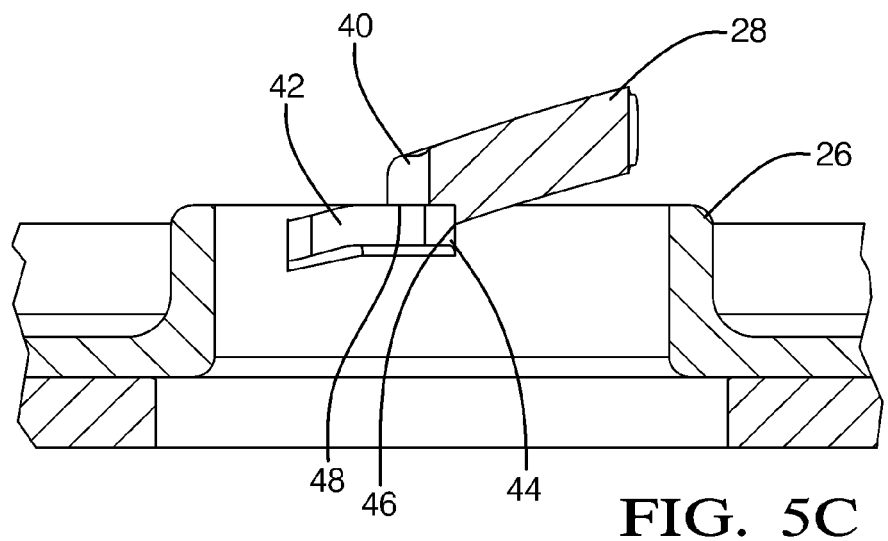

When the inner section 30A separates from the outer section 30B following an over-torque condition, the lifting ridge 42 will move along the helical ridge 38 until the trailing edge 44 of the lifting ridge 42 encounters a leading edge 46 of the notch of the locking feature 40. After the trailing edge 44 of the lifting ridge 42 passes the leading edge 46 of the locking feature 40, the lifting ridge 42 will be pulled to a bottom 48 of the notch of the locking feature 40 by armature springs (not shown) that hold the armature 20 away from the rotor 22 when the clutch is disengaged. Thus, the lifting feature 26 is prevented from counter-rotating because the lifting ridge 42 is held in the locking feature 40 by the springs. A sequence of the motion of the lifting ridge 42 in relation to the helical ridge 38 resulting in the engagement of the trailing edge 44 with the locking feature 40 is shown in FIG. 5.

Accordingly, an automotive air conditioner compressor assembly 10 comprised of a compressor 12, clutch 14 and over-torque protection device 16 is provided. The embodiments presented provide improved performance over existing means for disengaging a clutch 14 in response to an over-torque condition. The over-torque protection device 16 can quickly decouple the clutch 14 within less than one revolution; at a typical engine idle speed of 600 RPM, less than 100 milliseconds. Thermal fuses and thermal sensors may require more time for friction to generate sufficient heat to raise the temperature of the clutch 14 to their activation point. Motion sensors may also require more time to detect that the compressor has stopped rotating or that a speed differential exists between the compressor and accessory drive.

Thermal fuses and thermal sensors are not desirable for over-torque protection devices in automotive air conditioner compressor assemblies 10 where the accessory drive pulley 18 has a low engagement percentage. The accessory drive pulley 18 may experience belt slip during an over-torque condition before slip between the armature 20 and rotor 22 occurs, causing failure of the accessory drive belt. In contrast, the automotive air conditioning compressor assembly 10 presented here may be used with an accessory drive pulley 18 having a low engagement percentage because the frangible element 30 may be configured so that the torque required to break the spokes 34 is lower than the belt slip torque.

Frangible elements used previously to decouple a compressor from an accessory drive may experience undesirable residual torque or heat generation caused by contact of the broken ends of the frangible element during subsequent rotation. In contrast, the over-torque protection device 16 presented here axially urges apart the outer section 30B from the inner section 30A so that they are no longer coplanar; preventing the broken ends of the spokes 34 from coming into contact during subsequent rotation. Additionally, the over-rotation feature 32 may be configured so that the rotation of the outer section 30B stops before the broken ends of the spokes on the outer section 30B contact the broken ends of the spokes 34 on the inner section 30A.

An additional embodiment may include a method and/or apparatus to monitor current in the coil 24 using an electronic controller and de-energize the coil 24 when a current anomaly caused by the armature 20 being separated from the rotor 22 is detected. This would provide additional protection against inadvertent clutch reengagement during an over-torque condition.

While this invention has been described in terms of the preferred embodiments thereof, it is not intended to be so limited, but rather only to the extent set forth in the claims that follow.

I claim:

1. An air conditioning compressor assembly comprising:
   a compressor operable to compress material within the compressor and driven by a drive shaft, said compressor capable of exhibiting an over-torque condition;
   An accessory drive coupled to a rotor;
   an electromagnetic clutch interposed between the compressor and the accessory drive, wherein the electromagnetic clutch is operable to an engaged state by urging the rotor and an armature of the electromagnetic clutch together via magnetic force from a magnetic field generated in the rotor, thereby coupling the accessory drive to the compressor for operating the compressor, and wherein the electromagnetic clutch is operable to a disengaged state which decouples the compressor and the accessory drive;
   a frangible element adapted to fracture when the over-torque condition occurs;
   A lifting feature fixed to the armature;
   a ramp that is in a fixed position relative to the compressor drive shaft;
   wherein the ramp defines a helical ridge, and the lifting feature defines a lifting ridge engaging the helical ridge, wherein when the frangible element fractures, relative rotation between the lifting feature and the ramp exerts an axial mechanical force in opposition to the magnetic force that also overcomes the magnetic force, and the ramp moves the armature apart from the rotor which also decouples the compressor and the accessory drive.

2. The air conditioning compressor assembly in accordance with claim 1, wherein said air conditioning compressor assembly further comprises an over-rotation feature, wherein the over-rotation feature limits the relative rotation between the lifting feature and the ramp to less than one rotation after the frangible element has fractured.

3. The air conditioning compressor assembly in accordance with claim 1, wherein said air conditioning compressor assembly further comprises a locking feature that prevents counter-rotation of the lifting feature after relative rotation between the lifting feature and the ramp has urged the armature and the rotor apart to decouple the compressor and the accessory drive.

4. The air conditioning compressor assembly in accordance with claim 3, wherein the locking feature comprises a notch on a leading edge of the ramp that engages a trailing edge of the lifting feature.

5. The air conditioning compressor assembly in accordance with claim 1, wherein the frangible element comprises spokes, wherein said spokes are adapted to fracture when the frangible element is subjected to torque loads greater than a torque threshold indicative of the over-torque condition.

6. The air conditioning compressor assembly in accordance with claim 5, wherein said spokes are embossed to be a controlled thickness, so as to more precisely define a reaction torque.

7. An electromagnetic clutch assembly for use with an air conditioning compressor drive shaft comprising:
   An accessory drive coupled to a rotor;
   an electromagnetic clutch interposed between the compressor and the accessory drive, wherein the electromagnetic clutch is operable to an engaged state by urging the rotor and an armature of the electromagnetic clutch together via magnetic force from a magnetic field generated in the rotor, thereby coupling an accessory drive to the air conditioning compressor for operating the air conditioning compressor and wherein the electromagnetic clutch is operable to a disengaged state which decouples the compressor and the accessory drive;
   a frangible element adapted to fracture when an over-torque condition of the compressor occurs;
   A lifting feature fixed to the armature;
   a ramp that is in a fixed position relative to the air conditioning compressor drive shaft;
   wherein the ramp defines a helical ridge, and the lifting feature defines a lifting ridge engaging the helical ridge, wherein when the frangible element fractures, relative rotation between the lifting feature and the ramp exerts an axial mechanical force in opposition to the magnetic force that also overcomes the magnetic force, and the ramp moves the armature apart from the rotor which also decouples the air conditioning compressor and the accessory drive.

8. The electromagnetic clutch assembly in accordance with claim 7, wherein said electromagnetic clutch assembly further comprises an over-rotation feature, wherein the over-rotation feature limits the relative rotation between the lifting feature and the ramp to less than one rotation after the frangible element has fractured.

9. The electromagnetic clutch assembly in accordance with claim 7, wherein said electromagnetic clutch assembly further comprises a locking feature that prevents counter-rotation of the lifting feature after rotation between the lifting feature and the ramp has urged the armature and the rotor apart to decouple the air conditioning compressor and the accessory drive.

10. The electromagnetic clutch assembly in accordance with claim 7, wherein a locking feature comprises a notch on a leading edge of the ramp that engages a trailing edge of the lifting feature.

11. The electromagnetic clutch assembly in accordance with claim 10, wherein the frangible element comprises spokes, wherein said spokes are adapted to fracture when the frangible element is subjected to torque loads greater than a torque threshold indicative of the over-torque condition.

12. The electromagnetic clutch assembly in accordance with claim 11, wherein said spokes are embossed to be a controlled thickness, so as to more precisely define a reaction torque.

* * * * *